US012789340B2

(12) United States Patent
Amend et al.

(10) Patent No.: US 12,789,340 B2
(45) **Date of Patent: *Nov. 10, 2026**

(54) IMPACT TOOL WITH SPLIT ANVIL

(71) Applicant: Ingersoll-Rand Industrial U.S., Inc., Davidson, NC (US)

(72) Inventors: Ryan S. Amend, Bethlehem, PA (US); Edward C. Eardley, Easton, PA (US)

(73) Assignee: Ingersoll-Rand Industrial U.S., Inc., Davidson, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 19/249,205

(22) Filed: Jun. 25, 2025

(65) Prior Publication Data

US 2025/0319581 A1 Oct. 16, 2025
US 2026/0316246 A2 Oct. 15, 2026

Related U.S. Application Data

(63) Continuation of application No. 18/239,362, filed on Aug. 29, 2023, now Pat. No. 12,440,954, which is a (Continued)

(51) Int. Cl.
*B25D 17/06* (2006.01)
*B25B 21/02* (2006.01)

(52) U.S. Cl.
CPC .............. *B25D 17/06* (2013.01); *B25B 21/02* (2013.01); *B25D 2217/0015* (2013.01); *B25D 2250/105* (2013.01)

(58) Field of Classification Search
CPC ............ B25D 17/06; B25D 2217/0015; B25D 2250/105; B25B 21/02
See application file for complete search history.

(56) References Cited

U.S. PATENT DOCUMENTS 3,734,515 A * 5/1973 Dudek ................ B25B 23/0035 81/464
3,763,725 A 10/1973 Reiland
(Continued)

FOREIGN PATENT DOCUMENTS

CN 212240890 U 12/2020
CN 114619407 A * 6/2022 ............. B25D 17/06
(Continued)

OTHER PUBLICATIONS

Examination Report from European Application No. 23194910.8, dated Mar. 24, 2025.

(Continued)

*Primary Examiner* — Lucas E. A. Palmer
(74) *Attorney, Agent, or Firm* — Kevin E. West; Advent, LLP

(57) ABSTRACT

An impact tool having a split anvil assembly includes an internal anvil portion fixed inside a housing of the impact tool and an external anvil portion that is removably attached to the internal anvil portion and extends outside of the housing. The external anvil portion includes a retractable pin biased to an extended position to engage the internal anvil portion to secure the external anvil portion to the internal anvil portion and depressed to a retracted position to permit the external anvil portion to be disengaged from the internal anvil portion. The internal anvil portion and the external anvil portion may include respective internal and external grooves that interconnect with each other to link the movement of the internal anvil portion to the external anvil portion.

20 Claims, 10 Drawing Sheets

Related U.S. Application Data continuation-in-part of application No. 29/889,234, filed on Apr. 10, 2023, now Pat. No. Des. 1,094,050.

(60) Provisional application No. 63/404,063, filed on Sep. 6, 2022.

(56) References Cited

U.S. PATENT DOCUMENTS

| | | | | |
|---|---|---|---|---|
| 4,058,031 | A | 11/1977 | Magarian | |
| 4,416,338 | A * | 11/1983 | Nelson | B25D 17/08 251/297 |
| 4,583,694 | A | 4/1986 | Williams et al. | |
| D319,955 | S | 9/1991 | Keller et al. | |
| 5,163,519 | A * | 11/1992 | Mead | B25D 9/14 173/91 |
| 5,295,422 | A | 3/1994 | Chow | |
| 5,353,666 | A | 10/1994 | Rogers | |
| 5,440,957 | A | 8/1995 | Rogers | |
| 5,544,553 | A | 8/1996 | Galat | |
| D410,367 | S | 6/1999 | Applegate et al. | |
| 6,019,019 | A | 2/2000 | Hobbs | |
| 6,216,562 | B1 | 4/2001 | Hsieh | |
| 6,375,840 | B1 | 4/2002 | Hunter | |
| D462,246 | S | 9/2002 | Skeens | |
| D474,382 | S | 5/2003 | Tsai | |
| D491,428 | S | 6/2004 | Barnett et al. | |
| D506,908 | S | 7/2005 | Hsien | |
| D522,821 | S | 6/2006 | Hsieh | |
| 7,083,003 | B1 * | 8/2006 | Pusateri | B25D 17/005 173/132 |
| D573,426 | S | 7/2008 | DeRuntz et al. | |
| 7,437,977 | B2 | 10/2008 | Hsieh | |
| 7,510,023 | B1 * | 3/2009 | Cheng | B25B 21/02 173/93.5 |
| 7,770,495 | B1 * | 8/2010 | Huang | B25B 13/465 81/177.5 |
| 8,146,461 | B1 * | 4/2012 | Su | B25B 23/0035 81/177.85 |
| D714,116 | S | 9/2014 | Jiang | |
| 9,079,286 | B1 * | 7/2015 | DeCamillis | B25D 17/08 |
| 10,081,094 | B2 | 9/2018 | Doroslovac et al. | |
| 10,434,632 | B2 * | 10/2019 | Chang | B25B 23/0035 |
| D889,224 | S | 7/2020 | Kukucka et al. | |
| 10,780,556 | B2 | 9/2020 | Kukucka et al. | |
| 10,800,015 | B2 | 10/2020 | Zhang | |
| 11,045,925 | B2 | 6/2021 | Kukucka et al. | |
| D982,407 | S | 4/2023 | Paoli | |
| D1,022,639 | S | 4/2024 | Su | |
| D1,026,605 | S | 5/2024 | LeCompte et al. | |
| D1,054,265 | S | 12/2024 | Hawkins et al. | |
| D1,091,433 | S | 9/2025 | Reynolds et al. | |
| D1,094,050 | S | 9/2025 | Eardley et al. | |
| 12,440,954 | B2 * | 10/2025 | Amend | B25D 17/06 |
| 12,553,553 | B2 | 2/2026 | Doi et al. | |
| D1,115,473 | S | 3/2026 | Rodriguez | |
| D1,123,549 | S | 4/2026 | Dugin et al. | |
| 2003/0098168 | A1 * | 5/2003 | Frauhammer | B25D 17/06 173/47 |
| 2004/0093996 | A1 | 5/2004 | Fu | |
| 2005/0173139 | A1 * | 8/2005 | Furuta | B25D 16/006 173/48 |
| 2009/0223690 | A1 | 9/2009 | Sugimoto et al. | |
| 2010/0300716 | A1 * | 12/2010 | Amend | B25B 21/026 173/93 |
| 2011/0056714 | A1 * | 3/2011 | Elger | B25B 23/0035 173/128 |
| 2012/0279736 | A1 * | 11/2012 | Tanimoto | B25B 21/026 173/117 |
| 2012/0292065 | A1 * | 11/2012 | Hoshi | B25B 21/02 173/93 |
| 2012/0304836 | A1 * | 12/2012 | Haman | B25B 23/0035 81/177.85 |
| 2013/0112449 | A1 * | 5/2013 | Lu | B25B 21/026 173/126 |
| 2014/0069674 | A1 * | 3/2014 | Tsai | B25B 21/026 173/93 |
| 2014/0260832 | A1 | 9/2014 | Hsiao | |
| 2015/0231769 | A1 * | 8/2015 | Golden | B25B 21/026 173/93 |
| 2017/0028537 | A1 * | 2/2017 | McClung | B25B 21/026 |
| 2017/0036327 | A1 * | 2/2017 | Murakami | B25F 5/006 |
| 2017/0259412 | A1 | 9/2017 | Nishikawa et al. | |
| 2019/0134800 | A1 | 5/2019 | Kumagai et al. | |
| 2019/0262978 | A1 * | 8/2019 | Tejima | B25B 21/026 |
| 2019/0270188 | A1 * | 9/2019 | Zhang | B25B 23/0035 |
| 2019/0283221 | A1 * | 9/2019 | Chen | B25B 23/0035 |
| 2019/0321958 | A1 * | 10/2019 | Cooper | B25B 21/026 |
| 2020/0016729 | A1 * | 1/2020 | Zimmermann | B25B 21/007 |
| 2020/0039037 | A1 | 2/2020 | McClung et al. | |
| 2020/0269407 | A1 | 8/2020 | Kawai | |
| 2021/0023629 | A1 * | 1/2021 | Kawai | B25B 21/02 |
| 2021/0094157 | A1 * | 4/2021 | Chellew | B25B 21/02 |
| 2023/0381940 | A1 * | 11/2023 | Xu | B25D 17/06 |
| 2024/0075595 | A1 * | 3/2024 | Eardley | B25B 21/02 |
| 2024/0308032 | A1 | 9/2024 | LaPointe | |

FOREIGN PATENT DOCUMENTS

| | | | |
|---|---|---|---|
| EP | 1712332 | A2 | 10/2006 |
| WO | 2021197837 | A1 | 10/2021 |
| WO | 2023107540 | A1 | 6/2023 |

OTHER PUBLICATIONS

Extended European Search Report from European Application No. 23194909.0, dated Feb. 20, 2024.

Extended European Search Report from European Application No. 23194910.8, dated Feb. 8, 2024.

Ingersoll Rand AP41H DXS2 1/2" Drive Pin Anvil Attachment for 2236 Series DXS2 Air Impact Wrenches; Ingersoll Rand; Amazon.com; Feb. 3, 2024; Acc Jan. 24, 2025; URL: https://www.amazon.com/Ingersoll-Rand-AP41 H-Attachment-Wrenches/dp/B0CTVTYHBF (Year: 2024).

* cited by examiner

IMPACT TOOL WITH SPLIT ANVIL

CROSS-REFERENCE TO RELATED APPLICATIONS

The present application is a continuation of U.S. patent application Ser. No. 18/239,362, filed Aug. 29, 2023 and titled "Impact Tool with Split Anvil," which is a continuation-in-part under 35 U.S.C. § 120 of and claims the benefit of priority from U.S. patent application Ser. No. 29/889,234, filed Apr. 10, 2023, and titled "Tool Attachment", and claims priority under 35 U.S.C. § 119 (e) of U.S. Provisional Application Ser. No. 63/404,063, filed Sep. 6, 2022, and titled "Impact Tool with Split Anvil and Lubrication Port". U.S. patent application Ser. No. 18/239,362, U.S. patent application Ser. No. 29/889,234, U.S. Provisional Application Ser. No. 63/404,063 and the Non-Provisional Application Serial No. 18/239,403 titled "Impact Tool with Front Lubrication Assembly" dated Aug. 29, 2023 are incorporated by reference herein in their entireties.

BACKGROUND

Impact tools are power tools configured to deliver a high torque output by storing energy in a rotating mass and delivering it suddenly through an output shaft to a fastener. Impact tool anvils provide an interface between an impact tool hammer and a socket used to tighten the fastener. As impact tools become more powerful, sizing standards limit what can be done to strengthen the anvils, resulting in premature wear and breakage of the anvils.

DRAWINGS

The Detailed Description is described with reference to the accompanying figures. The use of the same reference numbers in different instances in the description and the figures may indicate similar or identical items.

DETAILED DESCRIPTION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

Overview

Impact tools (e.g., impact wrenches, etc.) are designed to deliver a high torque output with minimal exertion by the user. A rotating mass (e.g., a hammer) stores energy and abruptly delivers the stored energy to an anvil connected to an output shaft, subjecting the anvil to repeated and sudden shock loading.

Over the years, impact tools have become more powerful, yet sizing standards (which ensure tool to socket compatibility) have limited what can be done to strengthen the anvil components, such as square ends located at an output end of the anvils. These limitations have resulted in increased instances of premature wear and breakage of anvils, resulting in a loss of transmittable torque or the tool being rendered unusable. Typically, impact tools must be disassembled in order to replace the broken or worn anvils, causing time delays, especially when the impact tool is returned to the manufacturer or a third party maintenance provider for service.

The impact tool described herein includes a split anvil assembly having at least a first half and a second half, or an internal anvil portion fixed inside a housing of the impact tool and an external anvil portion that extends outside the housing of the impact tool. The external anvil portion is removably connected to the internal anvil portion and may be disengaged from the external anvil portion and completely removed from the housing. The external anvil portion may be selected from a plurality of replaceable anvil attachments, including but not limited to anvils with different drive sizes, socket extensions, custom sockets, etc. that are interchangeable without disassembling the impact tool.

DETAILED DESCRIPTION OF EXAMPLE EMBODIMENTS

Figure 1:
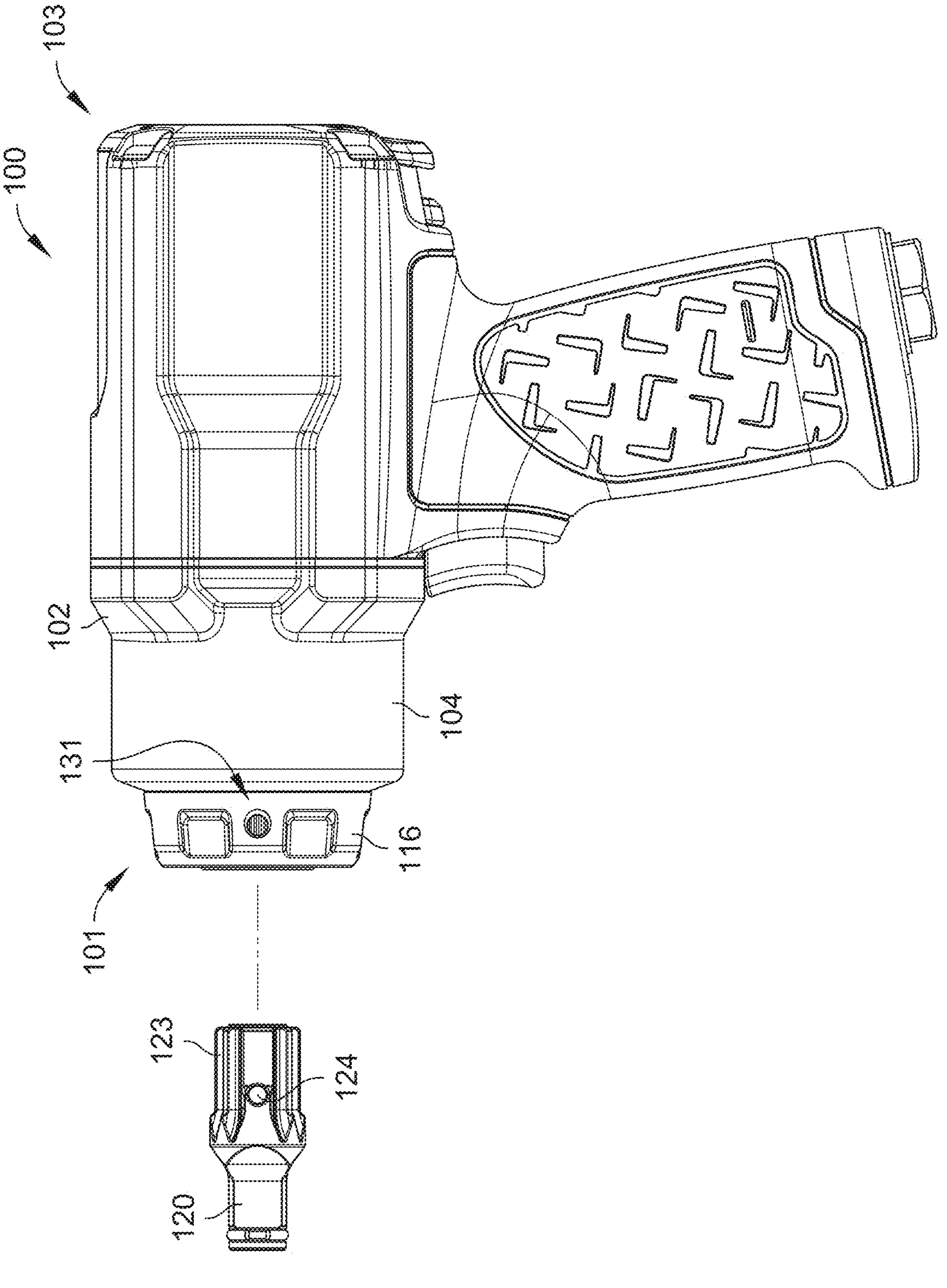
FIG. 1 is a side view of an impact tool having a split anvil assembly in accordance with example embodiments of the present disclosure.
Figure 2:
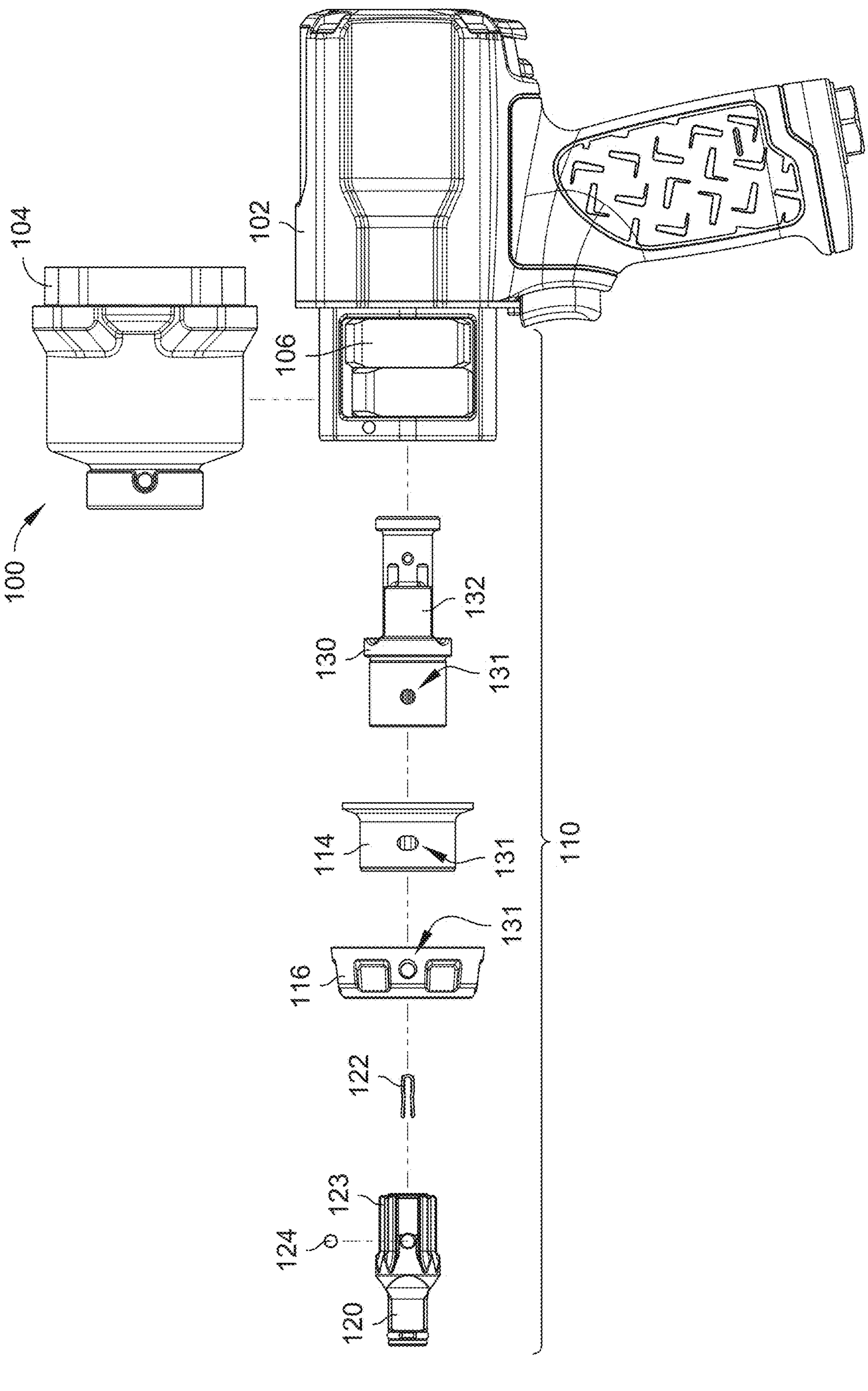
FIG. 2 is an exploded side view of the impact tool shown in FIG. 1 in accordance with example embodiments of the present disclosure.

Referring generally to FIGS. 1 through 11, an impact tool having a split anvil assembly is described. FIG. 1 shows an illustrative embodiment of an impact tool assembly 100 in accordance with the present disclosure. As illustrated, the impact tool assembly 100 includes a housing 102 having a front end 101 and a rear end 103. The housing 102 houses an impact assembly 110 that includes a drive mechanism 105 which rotates a hammer 106 of the impact assembly 110 around an output axis 100A. The output axis 100A extends from the front end 101 to the rear end 103. As shown in FIG. 2, the impact tool assembly 100 includes a hammercase 104 that houses an impact assembly 110. The impact tool assembly 100 may further include a gear set assembly 107 housed within the housing 102 connecting the drive assembly 105 with the hammer 106.

In embodiments, the drive mechanism 105 comprises a pneumatic (compressed air) motor powered by a source of compressed air (not shown). However, it is contemplated that the impact tool 100 may also include an electric motor powered by a power source such as a removable battery, an internal battery, an external power source via an electric cord, combinations thereof, or the like.

The hammer 106 includes at least one hammer jaw 112. The impact assembly 110 further includes a split anvil assembly 115 including an external anvil portion 120 and an internal anvil portion 130, where the internal anvil portion 130 is retained inside the hammercase 104 and the external anvil portion 120 is removably attached to the internal anvil portion 130 in the hammercase 104. The external anvil portion 120 extends longitudinally from the front end 101 outside of the hammercase 104 and the housing 102. The internal anvil portion 130 includes at least one anvil jaw 132 configured to be repeatedly struck by the at least one hammer jaw 112 and rotate around the axis 100A. As the hammer 106 continuously and intermittently impacts against the internal anvil portion 130 of the split anvil assembly 115, the external anvil portion 120 continuously rotates when the external anvil portion 120 is engaged and secured to the internal anvil portion 130. An output shaft 125 extends from the external anvil portion 120 and may receive a connector, a socket, or other device that engages a workpiece such as a fastener (e.g., a bolt, a nut, a screw, etc.) to be tightened or loosened.

The hammercase 104 includes a bushing 114 and a ring 116 for holding the internal anvil portion 130 in place. The bushing 114, the cover 116, and the internal anvil portion 130, respectively include access ports 131 disposed on the surface of the bushing 114, the ring 116, and the internal anvil portion 130, respectively. The access ports 131 comprise through holes that extend from an outside surface to an inside surface of the bushing 114, the ring 116, and the internal anvil portion 130, and are aligned with each other.

Figure 3:
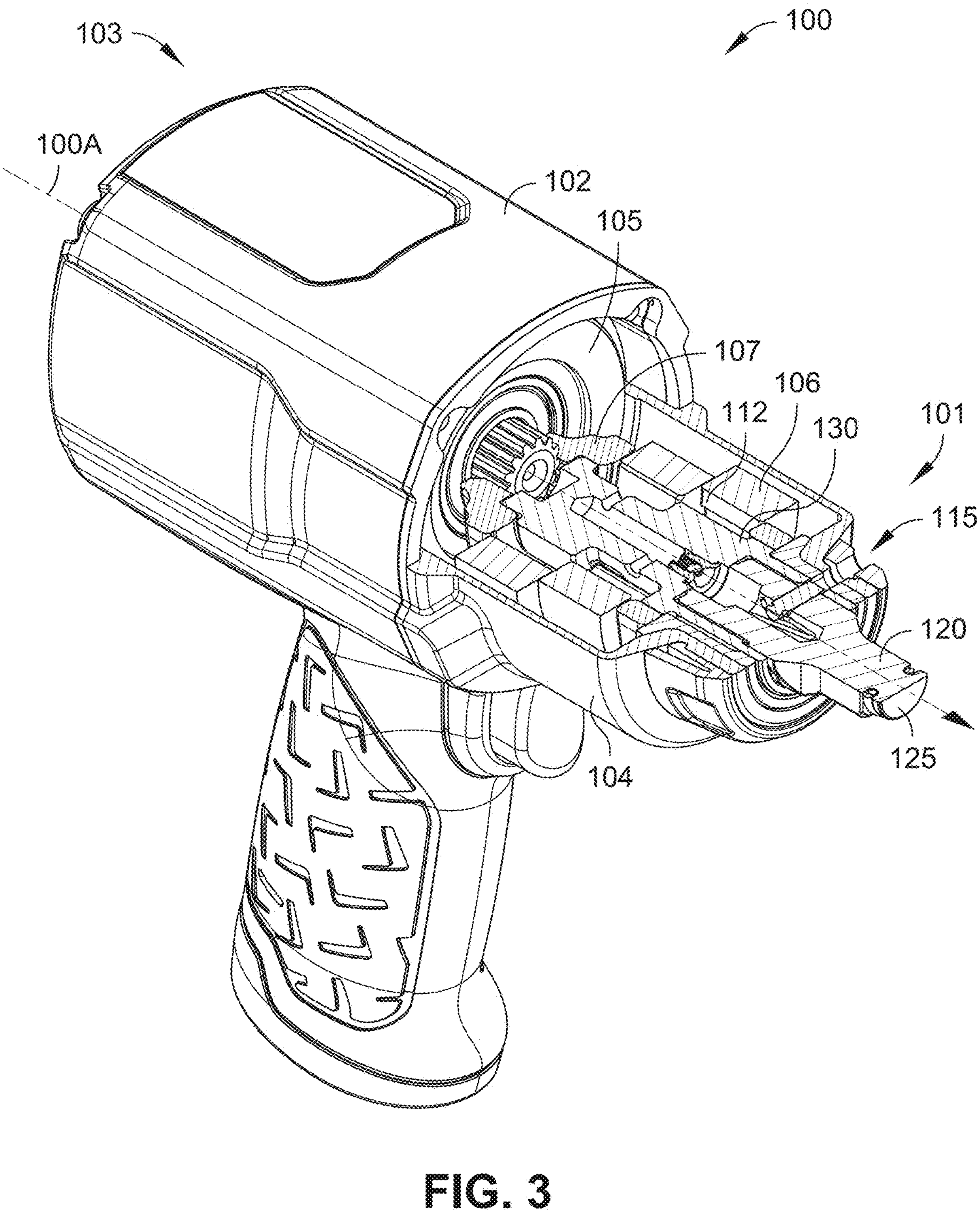
FIG. 3 is a perspective cross-sectional view of a front end of the impact tool shown in FIG. 1 showing the split anvil assembly having a retainer pin and a biasing member disposed within a cavity defined by the split anvil assembly in accordance with example embodiments of the present disclosure.
Figure 5:
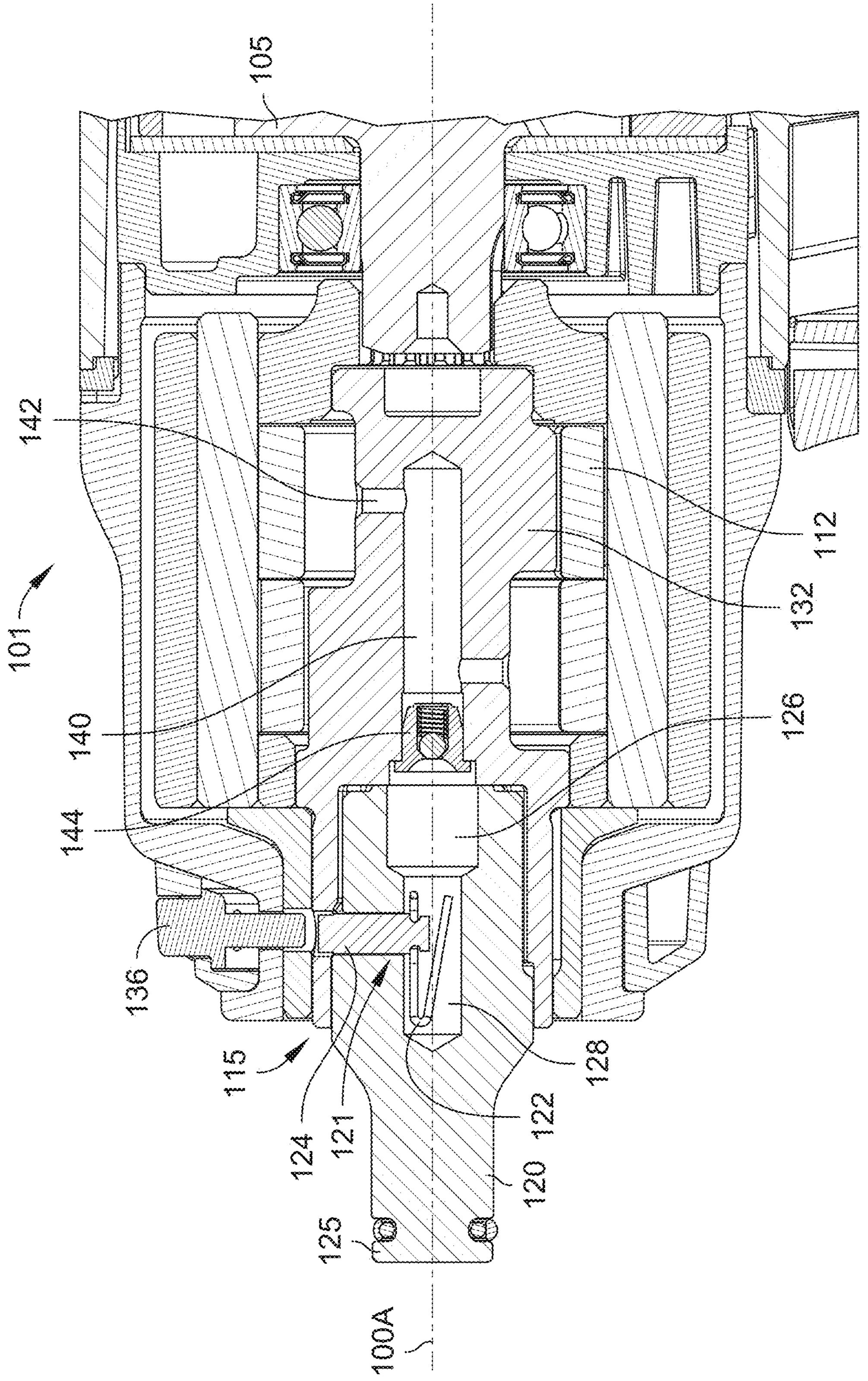
FIG. 5 is a cross-sectional side view of the split anvil assembly shown in FIG. 4 in accordance with example embodiments of the present disclosure.

Referring to FIGS. 2, 3 and 5, the internal anvil portion 130 defines an internal anvil portion cavity 135 that receives the external anvil portion 120. In example embodiments, the internal anvil portion cavity 135 may further define an opening that may be used for accessing components within the hammercase 104 and/or the impact assembly 110 that may otherwise be inaccessible without the disassembly of the impact tool 100. In example embodiments, the internal anvil portion cavity 135 may further define a lubrication passage 140 and at least one lubrication channel 142. A lubrication port 144 is disposed within the internal anvil portion cavity 135 at an opening of the lubrication passage 140. It should be understood that in other embodiments, the internal anvil portion cavity 135 may not include a lubrication passage or any other opening allowing the user to access the internal components of the impact assembly 110.

In example embodiments, the external anvil portion 120 defines an external anvil portion cavity 126 including a retaining cavity 128, and a retaining orifice 121. The external anvil portion cavity 126 houses at least a portion of a retractable pin 124. The retractable pin 124 is configured to engage with the access port 131 of the internal anvil portion 130, thereby effectively locking the external anvil portion 120 and the internal anvil portion 130. The retractable pin 124 limits rotational displacement in relation to axis 100A and limits longitudinal displacement along axis 100A between the external anvil portion 120 and the internal anvil portion 130. Upon retraction of the retractable pin 124, the external anvil portion 120 disengages with the internal anvil portion 130, allowing the external anvil portion 120 to be removed from the internal anvil portion cavity 135. The external anvil portion 120 disengages from the impact tool assembly 100, thereby exposing the internal anvil portion cavity 135.

The retaining cavity 128 houses a biasing member 122 that retains the retaining pin 124 within the retaining orifice 121. In embodiments, when the external anvil portion 120 is engaged with the internal anvil portion 130, the biasing member 122 biases the retaining pin 124 outward towards the access port 131 of the internal anvil portion 130, locking the two portions of the split anvil assembly 115 together. In order to separate the external anvil portion 120 and the internal anvil portion 130, the retaining pin 124 may be depressed with an elongated tool (not shown) until the retaining pin 124 is fully depressed out of the access port 131. The output shaft 125 of the split anvil 115 can be replaced by inserting an appropriately sized elongated tool (e.g., a screwdriver) through the access port 131 and depressing the retaining pin 124.

Figure 4:
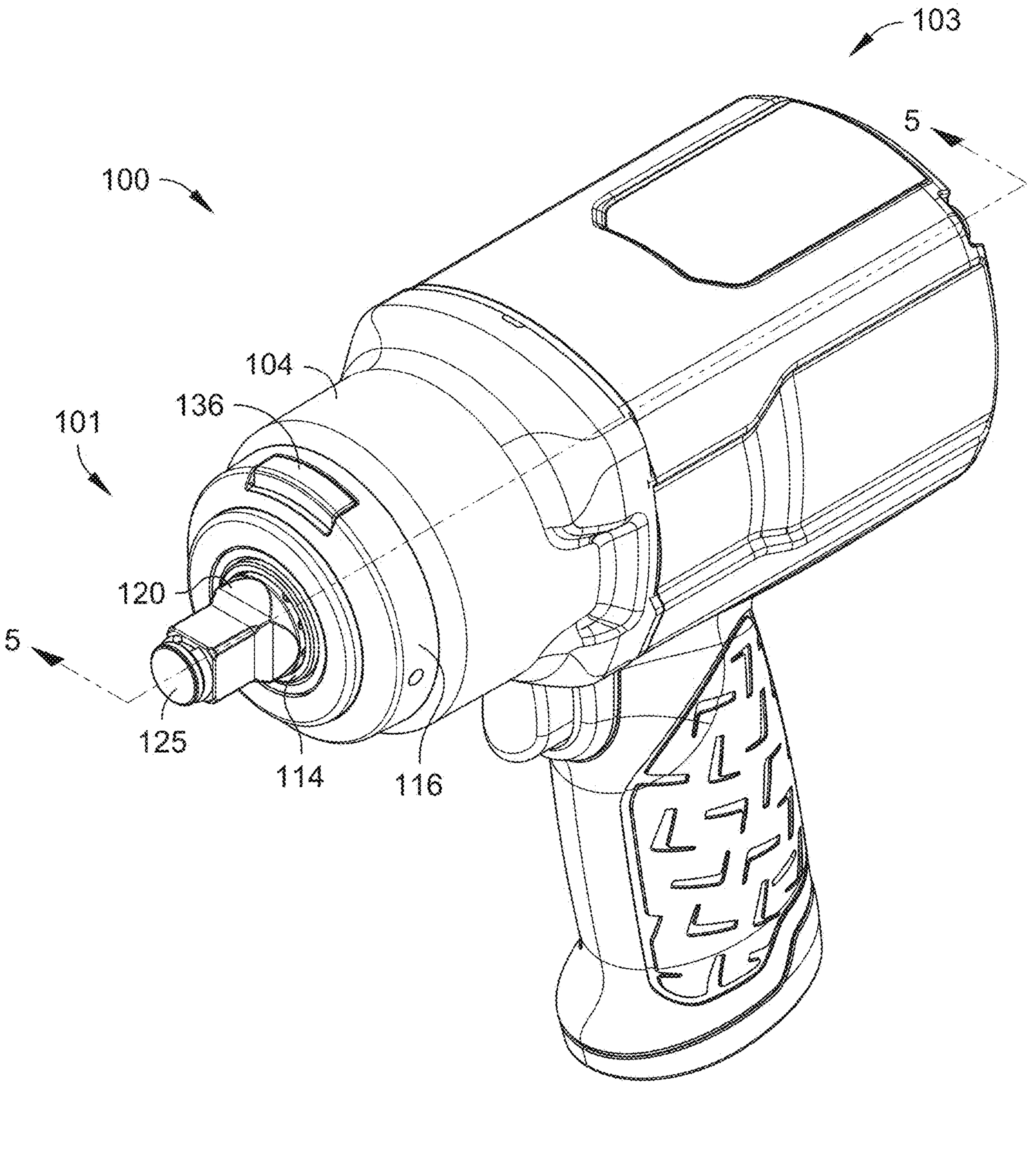
FIG. 4 is a perspective view of an impact tool having a split anvil assembly and an anvil release button in accordance with example embodiments of the present disclosure.

In other embodiments shown, for example in FIGS. 4 and 5, the impact tool assembly 100 includes a button 136 that actuates the retaining pin 124 and moves it between an engaged position and a disengaged position. In the embodiment shown, the button 136 is a push button disposed on the ring 116. In the engaged position, the retaining pin 124 is engaged with the access port 131 of the internal anvil portion 130, and securing the external anvil portion 120 from movement relative to the internal anvil portion 130. In the disengaged position, the retaining pin 124 is pushed into the retaining cavity 126, effectively disengaging the retaining pin 124 from the access port 131 of the internal anvil portion 130. As the external anvil portion 120 is disengaged from the internal anvil portion 130, the external anvil portion 120 may be fully disengaged and separated from the rest of the split anvil assembly 115 and the impact tool assembly 100.

In other embodiments (not shown) the external anvil portion 120 may be removably retained within the internal anvil assembly 130 using a retaining cap. For example, the retaining cap may be secured, screwed, or fastened to the front end 101 of the hammercase 104. For example, the retaining cap may be secured to an external surface of the ring 116 and cover at least a portion of the external anvil assembly 120.

The retaining cap may be secured to the front end 101 of the hammercase 104 via a connector. A variety of connectors are contemplated. For example, the retaining cap may include at least one lug or projection configured to engage on an at least one notch (e.g., a cam path) of the ring 116. The retaining cap may be fully mated or coupled to the hammercase 104 by rotating the retaining cap in relation to axis 100A for at least a portion of a full three-hundred and sixty degree (360°) rotation.

In other embodiments (not shown), the external anvil portion 120 may be removably retained within the internal anvil portion 130 using a retractable ball detent mechanism. In a retractable ball detent mechanism, a ball disposed on a first half portion engages into a groove or notch disposed on a second half portion, effectively retaining the first half portion and second half portions together. For example, the ball detent mechanism may be disposed on at least one of the external anvil portion 120 or the ring 116.

In embodiments where the ball detent mechanism is disposed on the ring 116, the impact tool assembly 100 may include a retaining cap, such as the retainer cap discussed above. The retaining cap may include at least one retaining notch, configured to engage with and secure the ball disposed on the ring 116. The retaining cap may be biased in a direction away from the hammercase 104.

In embodiments where the ball detent mechanism is disposed on the external anvil portion 120, a ball, may be disposed within the external anvil portion cavity 126 or on an external surface of the external anvil portion 120. The ball may be biased against a notch disposed on the internal anvil portion cavity 135 and restrict rotational and axial movement between the external anvil portion 120 and the internal anvil portion 130. The ball may be biased against the internal anvil via a biasing mechanism such as, but not restricted to, a compression spring, a torsion spring, a spiral spring, a plate or leaf spring, or other biasing components. The ball may be formed of a metal, a polymer, a ceramic, or a combination thereof. For example, the ball may be a steel ball.

The ball detent mechanism may be actuated through an orifice disposed on the housing of the impact tool assembly 100. For example, an orifice may be defined in the front end 101 of the impact tool assembly 100, such as through the front face of the output shaft 125. In other embodiments, the orifice may be disposed on the rear end 103 of the impact tool assembly 100. The orifice may define a borehole extending from the rear end 103 of the impact tool assembly to the ball detent mechanism disposed in the external anvil portion 120. In example embodiments, the borehole is parallel with the axis 100A. For example, the borehole may be coaxial and/or concentrically aligned with the axis 100A.

In other embodiments (not shown), the external anvil portion 120 may be removably retained within the internal anvil portion 130 using a friction ring or a hog ring. The friction ring may be coupled to the rear side of the external anvil portion 120. As the external anvil portion 120 is aligned and connected to the internal anvil portion 130, the friction ring compresses within the interior anvil portion cavity 135 until it reaches a friction ring notch defined on the surface of the interior anvil portion cavity 135. The friction ring expands, and the internal friction between the friction ring and the interior anvil portion cavity 135 holds the external anvil portion 120 secured to the internal anvil portion 130.

In the embodiment shown in FIGS. 6C through 10, the external anvil portion 120 includes external splines 123 defined around the circumference of the outer surface of the external anvil portion 120. The internal anvil portion 130 may also include internal splines 133 defined on an inner surface of the internal anvil portion cavity 135. The external splines 123 and the internal splines 133 may engage with each other, locking the external anvil portion 120 and restricting its rotation with respect with the internal anvil portion 130. The splines 123 and 133 allow for a transfer of the torque transmitted by the hammer 106 to the output shaft 125. The internal splines 131 and the external splines 123 are configured to engage with each other. It should be understood that the number of splines may change in embodiments of the split anvil assembly 115. The internal splines 131 and the external splines 123 may be shaped with square splines (tooth splines) or have differently shaped splines, including but not limited to radial slots, arc teeth, keyways, curvilinear splines, hex splines, and/or triple square splines.

Figure 7:
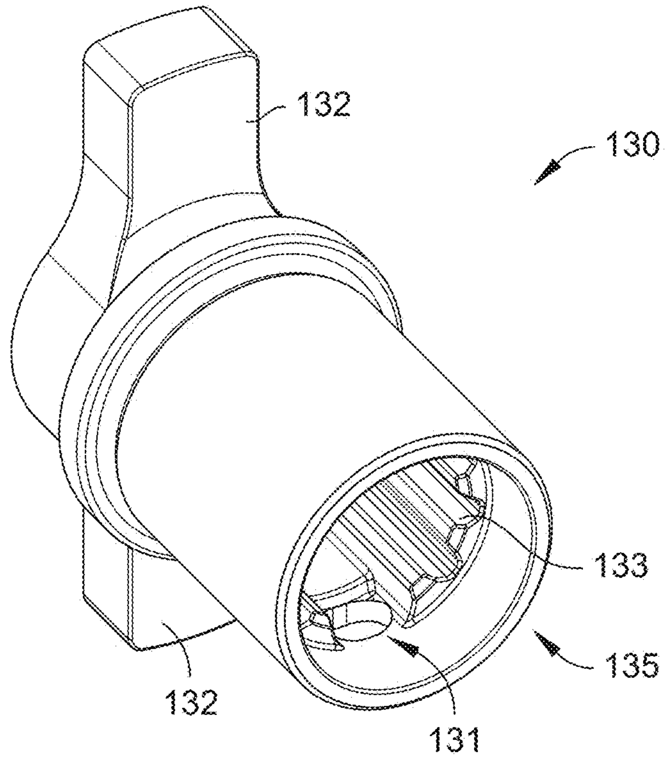
FIG. 7 is a perspective view of an internal anvil portion having an internal spline and a retaining hole in accordance with example embodiments of the present disclosure.
Figure 8:
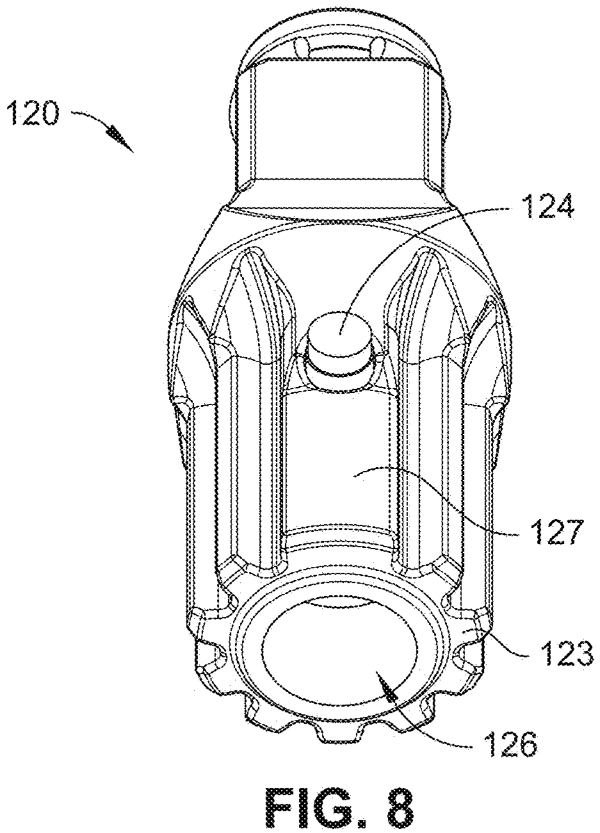
FIG. 8 is a perspective rear view of an external anvil portion having an external spline, where the external spline includes at least one retaining pin tooth in accordance with example embodiments of the present disclosure.
Figure 9:
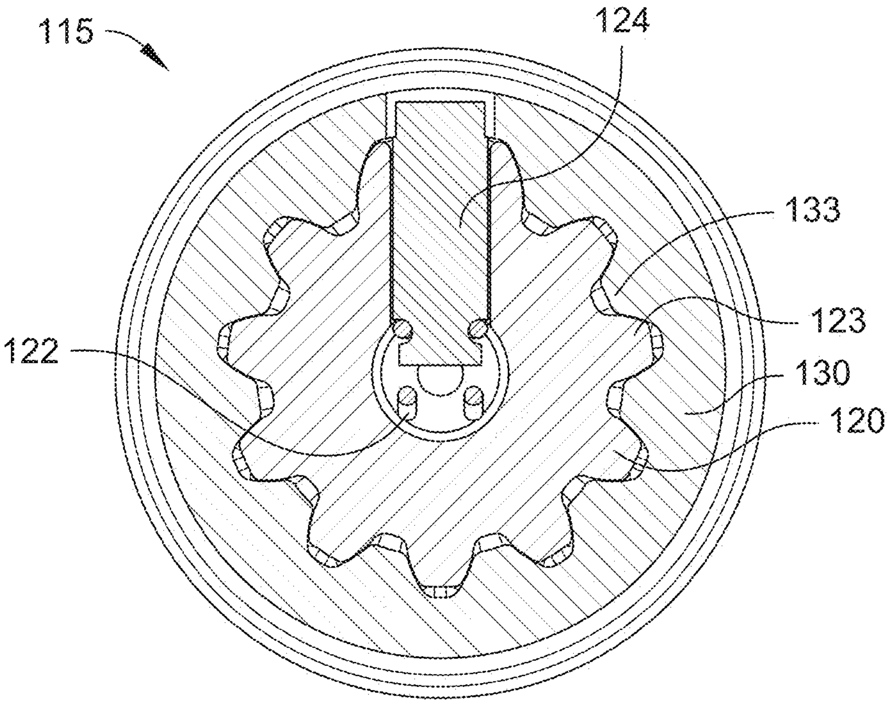
FIG. 9 is a cross-sectional front view of the external anvil portion engaged with the internal anvil, where the external anvil portion is retained by a spring-loaded retaining pin in accordance with example embodiments of the present disclosure.
Figure 10:
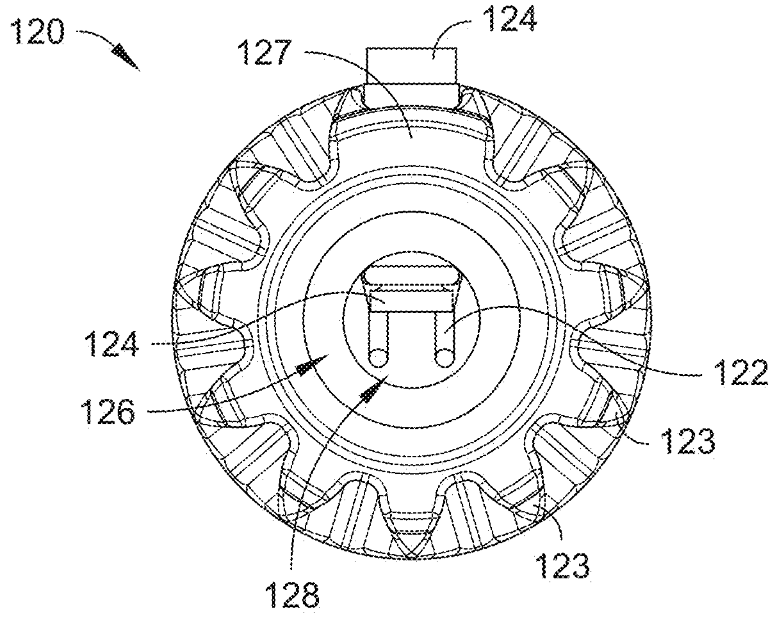
FIG. 10 is a rear view of the external anvil portion shown in FIG. 8 showing the spring-loaded retaining pin disposed within an external anvil portion cavity in accordance with example embodiments of the present disclosure.

In example embodiments, the external splines 123 and the internal splines 133 include at least one alignment spline tooth 127 and 137, respectively. The at least one alignment spline tooth may, for example, have a larger thickness than a remaining of the external splines 123 and the remaining of the internal splines 133. As shown in FIGS. 7 through 9, the retaining orifice 121 and the internal anvil portion access port 131 are respectively defined on the alignment spline teeth 127 and 137 of the external splines 123 and internal splines 133. The alignment spline teeth 127 and 137 provide guidance when the external anvil portion 120 is engaged with the internal anvil portion 130, in order to align the retaining orifice 121 of the external anvil portion 120 with the access ports 131 of the internal anvil portion 130 and other access ports 131 that may be defined in one or more of the hammercase 104, the bushing 114, and the ring 116. It should be understood that other types of alignment spline teeth may be used. For example, the at least one alignment spline tooth 127 and the at least one alignment spline tooth 137 may have a different shape and/or a different size from than the remaining of the external splines 123 and the remaining of the internal splines 133, respectively. The alignment spline teeth 127 and 137 may be thinner, taller, shorter, have a different spline radius, and/or a combination thereof.

Figure 6A:
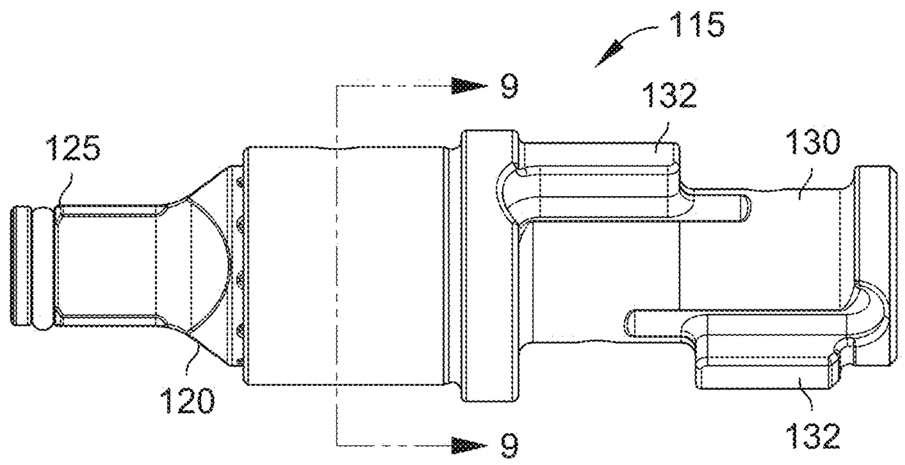
FIG. 6A is a side view of a split anvil assembly having an external anvil portion engaged with an internal anvil portion in accordance with example embodiments of the present disclosure.
Figure 6B:
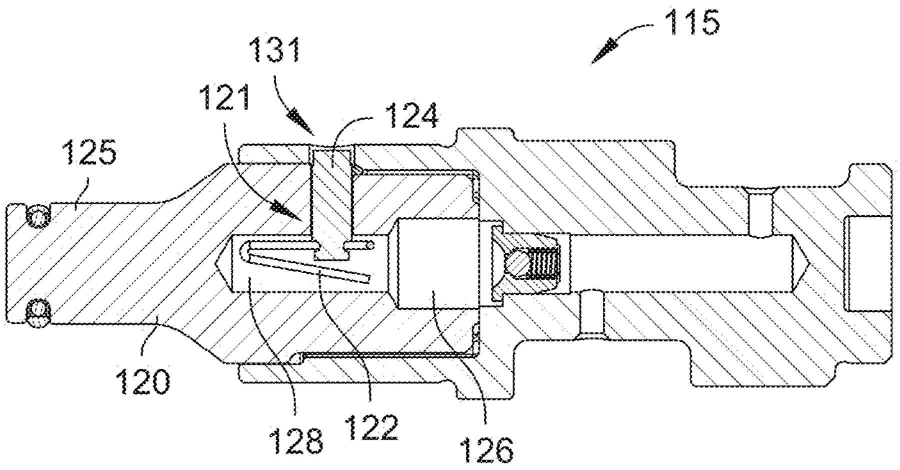
FIG. 6B is a cross-sectional side view of the split anvil assembly shown in FIG. 6A in accordance with example embodiments of the present disclosure.
Figure 6C:
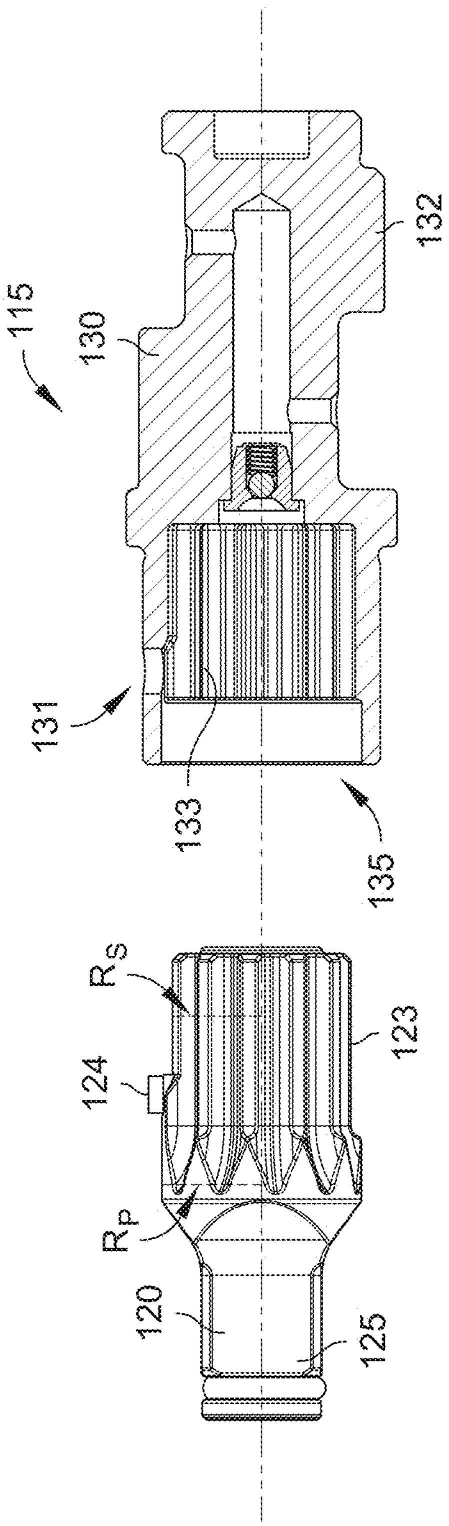
FIG. 6C is a side view of the external anvil portion and a cross-sectional side view of the internal anvil portion shown in FIG. 6A wherein the external anvil portion is disengaged from the internal anvil portion in accordance with example embodiments of the present disclosure.

Referring to FIG. 6C, the external anvil portion 120 includes a pilot radius $R_P$ and a spline radius $R_S$, where the pilot radius $R_P$ is the radius of a pilot of the external anvil portion with respect to the axis 100A and the spline radius $R_S$ is the radius of the external splines 123 with respect to the axis 100A. In embodiments where the pilot radius $R_P$ is larger than the spline radius $R_S$, the external anvil portion 120 is configured to disengage from the internal anvil portion 130 when the retractable pin 124 is depressed to a height that is at least one of equal to or less than the pilot radius $R_P$ of the external anvil 120. The difference in the radius decreases the amount of travel needed to disengage the retaining pin 124 from the access port 131 of the internal anvil portion 130. Further, having the spline radius $R_S$ be smaller also prevents the elongated tool used to depress the retaining pin 124 from catching on the external anvil portion 120 as it is removed.

Figure 11:
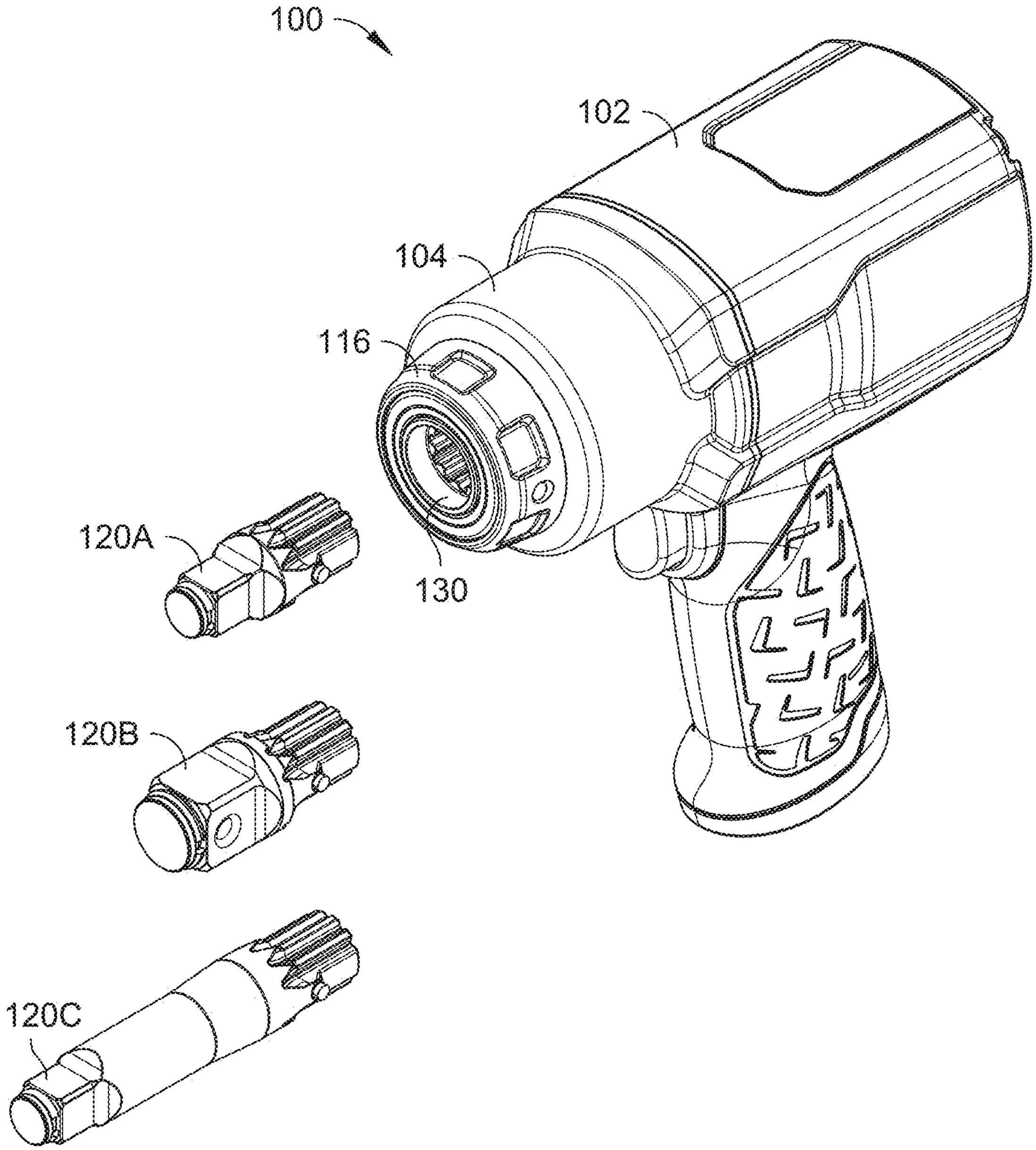
FIG. 11 is a perspective view of an impact tool having a split anvil assembly showing example embodiments of external anvils.

FIG. 11 shows different embodiments of the external anvil portion 120A, 120B, and 120C. These examples are not limiting and are used to show how the impact tool 100 having a split anvil assembly 115 may use interchangeable output shafts having different drive diameters, extended anvils, or accessories such as socket extensions and socket adapters. For example, different embodiments of the external anvil portion 120 may have different sizes of output shaft 125. The output shaft 125 of external anvil portion 120 may range from one-quarter of an inch (¼ in.) to two and one-half inches (2½ in.). For example, the output shaft may be sized for drive sizes of ¼ in., ⅜ in., ½ in., ¾ in., 1 in. 1½ in., and 2½ in. It should be understood that these drive sizes are examples and not limiting to any sizes in metric and/or imperial units.

While the subject matter has been illustrated and described in detail in the drawings and foregoing description, the same is to be considered as illustrative and not restrictive in character, it being understood that only example embodiments have been shown and described and that all changes and modifications that come within the spirit of the subject matters are desired to be protected. In reading the claims, it is intended that when words such as "a," "an," "at least one," or "one of a plurality of" are used there is no intention to limit the claim to only one item unless specifically stated to the contrary in the claim. Unless specified or limited otherwise, the terms "coupled" and "connected" and variations thereof are used broadly and encompass both direct and indirect mountings, connections, and couplings. Further, "connected" is not restricted to physical or mechanical connections or couplings.

What is claimed is:

1. An impact tool comprising:
a housing; and
a split anvil assembly including:
an internal anvil portion disposed inside the housing, the internal anvil portion defining an internal anvil portion cavity, and an access port;
an external anvil portion configured to be removably received within the internal anvil portion cavity and to engage with the internal anvil portion so that the external anvil portion rotates with the internal anvil portion;
a bushing having a bushing access port and configured to hold the internal anvil portion in the housing; and
a pin configured to secure the external anvil portion to the internal anvil portion,
wherein the pin is configured to be accessible through the bushing access port and engage with the internal anvil portion access port to lock the external anvil portion with respect to the internal anvil portion.

2. The impact tool of claim 1, wherein the pin is biased to an extended position to engage the internal anvil portion to secure the external anvil portion to the internal anvil portion and depressed to a retracted position to permit the external anvil portion to be disengaged from the internal anvil portion.

3. The impact tool of claim 2, wherein the external anvil portion includes a retaining orifice, the retaining orifice retaining the pin to the external anvil portion.

4. The impact tool of claim 3, wherein the pin includes a groove around an external circumference of the pin and the external anvil portion includes a biasing member disposed inside the external anvil portion cavity, the biasing member configured to engage with the groove, to retain the pin inside the external anvil portion cavity, and to bias the pin in a direction of the retaining orifice of the external anvil portion.

5. The impact tool of claim 4, wherein the external anvil portion includes external splines defined on an outer surface of the external anvil portion, and the internal anvil portion includes internal splines defined on an inner surface of the internal anvil portion, the external splines configured to engage with the internal splines.

6. The impact tool of claim 5, wherein the external splines and the internal splines respectively include at least one alignment spline tooth.

7. The impact tool of claim 6, wherein the at least one alignment spline tooth has a larger thickness than other ones of the external splines and other ones of the internal splines.

8. The impact tool of claim 6, wherein the external anvil portion retaining orifice is defined on the at least one alignment spline tooth of the external splines and the internal anvil portion access port is defined on the alignment spline tooth defined on the at least one alignment spline tooth of the internal splines.

9. The impact tool of claim 5, wherein a pilot radius of the external anvil portion has a larger radius than a spline radius of the external splines.

10. The impact tool of claim 5, wherein the external anvil portion is configured to disengage from the internal anvil portion when the pin is depressed to a height that is at least one of equal to or less than the pilot radius of the external anvil.

11. A split anvil assembly for an impact tool comprising:
an internal anvil portion disposed inside a housing of the impact tool and configured to be coupled to the housing through a bushing, the internal anvil portion defining an internal anvil portion cavity and an access port;
an external anvil portion configured to be removably received within the internal anvil portion cavity and to engage with the internal anvil portion so that the external anvil portion rotates with the internal anvil portion; and
a pin configured to secure the external anvil portion to the internal anvil portion,
wherein the bushing includes a bushing access port and wherein the pin is configured to be accessible through the bushing access port and engage with the internal anvil portion access port to lock the external anvil portion with respect to the internal anvil portion.

12. The split anvil assembly of claim 11, wherein the pin is biased to an extended position to engage the internal anvil portion to secure the external anvil portion to the internal anvil portion and depressed to a retracted position to permit the external anvil portion to be disengaged from the internal anvil portion.

13. The split anvil assembly of claim 12, wherein the external anvil portion includes a retaining orifice, the retaining orifice retaining the retractable pin to the external anvil portion.

14. The split anvil assembly of claim 13, wherein the pin includes a groove around an external circumference of the pin and the external anvil portion includes a biasing member disposed inside the external anvil portion cavity, the biasing member configured to engage with the groove, to retain the pin inside the external anvil portion cavity, and to bias the pin in a direction of the retaining orifice of the external anvil portion.

15. The split anvil assembly of claim 14, wherein the external anvil portion includes external splines defined on an outer surface of the external anvil portion, and the internal anvil portion includes internal splines defined on an inner surface of the internal anvil portion, the external splines configured to engage with the internal splines.

16. The split anvil assembly of claim 15, wherein the external anvil portion retaining orifice is defined on the at least one alignment spline tooth of the external splines and the internal anvil portion access port is defined on the alignment spline tooth defined on the at least one alignment spline tooth of the internal splines.

17. The split anvil assembly of claim 15, wherein a pilot radius of the external anvil portion has a larger radius than a spline radius of the external splines.

18. The split anvil assembly of claim 15, wherein the external anvil portion is configured to disengage from the internal anvil portion when the pin is depressed to a height that is at least one of equal to or less than the pilot radius of the external anvil.

19. The split anvil assembly of claim 14, wherein the external splines and the internal splines respectively include at least one alignment spline tooth.

20. An impact tool comprising:

a housing;

a split anvil assembly including:

an internal anvil portion disposed inside the housing, the internal anvil portion defining an internal anvil portion cavity and an access port, an external anvil portion configured to be removably received within the internal anvil portion cavity and to engage with the internal anvil;

a bushing having a bushing access port and configured to hold the internal anvil portion in the housing; and a pin configured to secure the external anvil portion to the internal anvil portion, wherein the pin is configured to be accessible through the bushing access port and engage with the internal anvil portion access port to lock the external anvil portion with respect to the internal anvil portion, and wherein the external anvil portion includes external splines defined on an outer surface of the external anvil portion, and the internal anvil portion includes internal splines defined on an inner surface of the internal anvil portion, the external splines configured to engage with internal splines.

* * * * *